INVENTOR.
Walter F. Gerdes
BY
Earl D. Ayers
AGENT

United States Patent Office 3,368,145
Patented Feb. 6, 1968

3,368,145
APPARATUS FOR MEASURING CHARGE CONDITION WITHIN A SOLUTION
Walter F. Gerdes, Lake Jackson, Tex., assignor to The Dow Chemical Company, Midland, Mich., a corporation of Delaware
Continuation-in-part of application Ser. No. 315,537, Oct. 11, 1963. This application Mar. 4, 1966, Ser. No. 536,543
11 Claims. (Cl. 324—32)

This application is a continuation-in-part of my copending application Ser. No. 315,537, filed Oct. 11, 1963, for "Control Apparatus," now abandoned.

This invention relates to novel apparatus for developing an alternating current electrical signal which can be utilized in the continuous regulation of flocculation of aqueous suspensions of finely divided charged particles and for other uses.

It is conventional practice in clarifying aqueous systems containing suspended particles to employ a flocculation operation. Once flocculated, the suspended particles can be separated from their water medium by sedimentation, filtration, flotation, centrifugation, or one or more of the foregoing physical separatory processes in combination. Conventionally the flocculation operation is promoted by the use of flocculating chemicals such as alum, ferric chloride and various polymeric materials such as water-soluble cationic and anionic organic polyelectrolytes. Aqueous suspensions of finely divided particles are encountered in natural or raw water supplies such as rivers and lakes and in municipal and industrial wastes, which latter systems include a substantial proportion of suspended organic particles.

In a typical flocculation process for the clarification of municipal sewage, a water-soluble cationic flocculating chemical is added to the sewage. The sewage normally comprises suspended negatively charged organic particles and thus the addition of the cationic agent results in charge neutralization on the suspended particles. When the average charge is zero, or some other predetermined value, the dispersed organic particles undergo flocculation, i.e., aggregation, at an optimum rate. Too much cationic agent, however, creates positively charged organic particles which can be as difficult to flocculate as are the originally negatively charged particles.

To date, however, determining how much chemical to add to the stream to be treated has been difficult, especially since the composition of such streams often varies over fairly wide ranges in time intervals of a few minutes to a few hours.

Various empirical approaches to "finding" the correct dosage of flocculant to be added to a stream have been used. For example, increasing amounts of flocculant may be added to samples from the stream and the amount of decrease in turbidity of the stream noted, the correct dosage being determined as the one which causes the greatest decrease in turbidity with the least addition of flocculant. Such a procedure is time consuming and therefore not really suitable where the composition of the treated stream varies.

Another approach is to use a so-called Zeta meter to determine the charge condition existing in the stream. The Zeta meter is used to observe the time required for a charged particle from the stream to pass a predetermined disance along a liquid path while under the influence of an electric field. This method is time consuming and requires a technician to perform the test and to interpret test results before the stream is treated with a greater, lesser, or the same amount of flocculant as had been used since the last previous Zeta meter test was made.

The usual methods of determining the dosage of flocculant to be added to a stream having suspended charged particles are discontinuous and require a substantial amount of individual labor in making the tests. The use of such tests in controlling flocculation of such streams is costly both from the standpoint of the labor involved and from the fact that the amount of flocculant actually required by the stream may vary from that indicated by the tests.

Accordingly, a principal object of this invention is to provide an improved instrument which is useful in controlling the dosage of chemicals to be added to a controllable stream having a charged condition existing therein.

Another object of this invention is to provide an improved, simpler, instrument for use in metering the addition of flocculant to a stream having dispersed charged particles therein.

A further object of this invention is to provide an improved instrument which is capable of developing, on a continuous basis, an electrical signal which is a function of the charge condition existing in a stream containing charged particles therein.

Still another object of this invention is to provide an improved instrument which is capable of developing an alternating current electrical signal which is a function of the charge condition existing in a sample comprising liquid, the instrument being capable of operation for substantial lengths of time without adjustment by a technician. An ancillary object of this invention is to provide an improved means for determination of the end point of a titration of materials having charge influencing characteristics.

In accordance with this invention there is provided a sample receiving electrically insulating block having a sample reservoir therein and having a bore extending downwardly from the lower part of the reservoir. A pair of reversible electrodes are disposed within the block, one of said electrodes being at least near to the lower end of the bore mentioned above and the other electrode being disposed near the upper end of said bore. A reciprocating rod-like piston or plunger is disposed in close fitting but slidable relationship within the bore.

Signal amplifying and signal utilization means are coupled to the above mentioned electrodes.

As sample is fed into the reservoir it enters the bore in which the rod-like piston is disposed (on the upstroke of the piston) and is expelled from the bore on the downstroke of the piston. The movement of the sample, which is at least predominantly liquid, into and out of the bore causes an alternating current signal to be developed across the electrodes. The signal is then amplified and coupled to a meter, recorder, servo control device, or other utilization device. The developed signal is a function of the charge condition existing in the stream.

The invention, as well as additional objects and advantages thereof, will best be understood when the following detailed description is read in connection with the accompanying drawings, in which.

Figure 1:
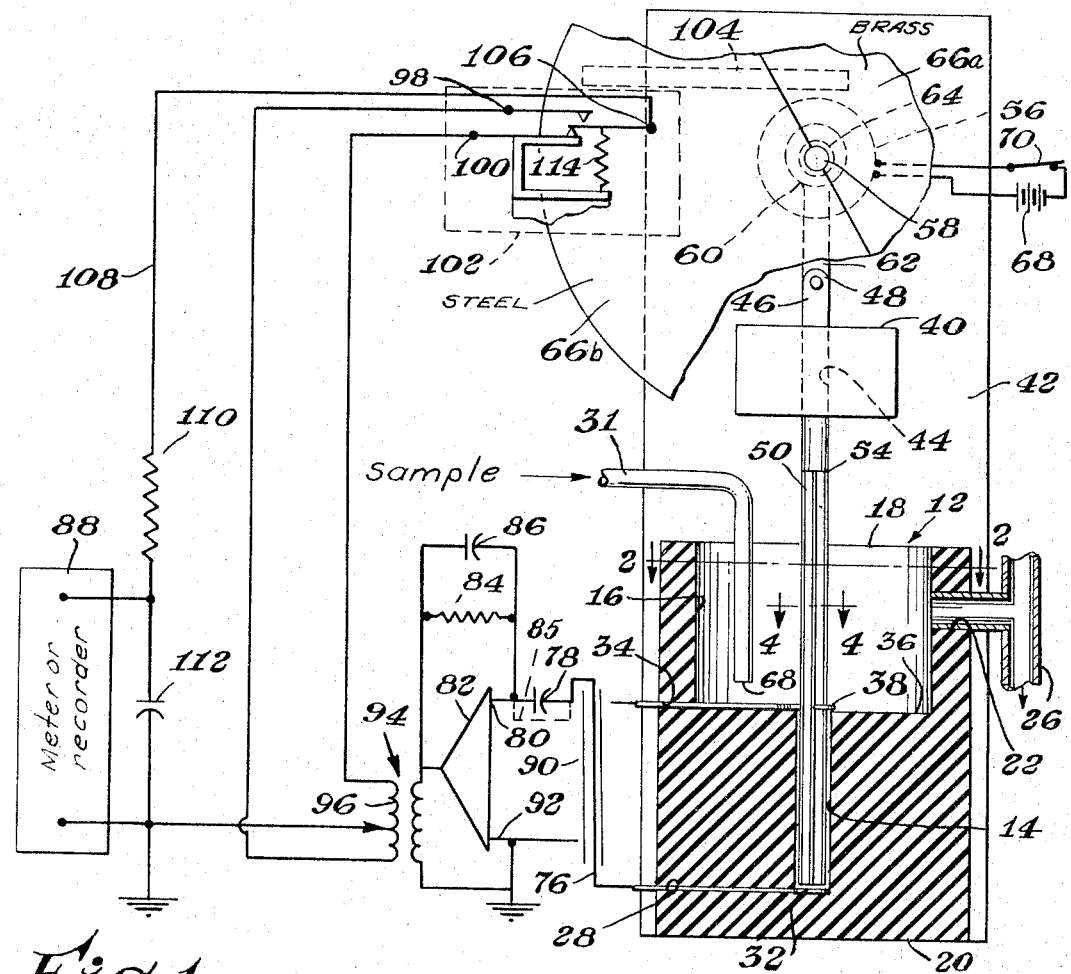
FIG. 1 is a diagrammatic view of an instrument made in accordance with this invention.
Figure 3:
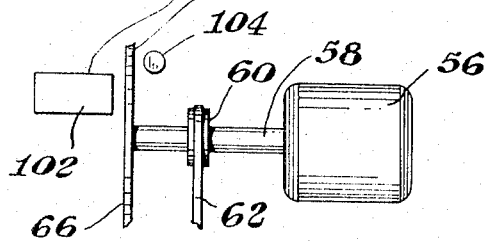
FIG. 3 is a side elevational view of the upper part of the apparatus shown in FIG. 1.
Figure 2:
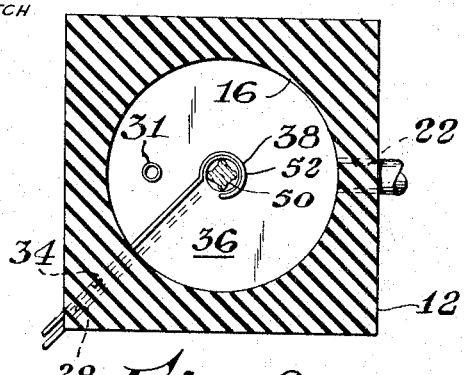
FIG. 2 is a sectional view taken along the line 2—2 of FIG. 1.

Referring to the drawing, there is shown apparatus in accordance with this invention for detecting the average electrical charge density on the insulating surfaces of an annulus, the charge density being a function of the charge influencing species, such as ions, charged molecules, or colloidal particles, for example, which are present in a liquid stream in flowing contact with said surface.

The apparatus, indicated generally by the numeral 10, comprises a sample receiving block or flow path member, indicated generally by the numeral 12, which has a generally perpendicularly disposed cylindrical operating bore 14 therein, the bore 14 extending to near the bottom of the block 12. A large diameter sample receiving counter bore 16 extends from the top 18 of the block about halfway to the lower end 20 of the block. A bore 22 extends from a side 24 of the block 12 to the counter bore 16. A T-shaped tubular element 26 is coupled to the bore 22 with the longitudinal axis of the cross-membered part of the T being perpendicular to the base end 20 of the block 12. A small bore 28 extends from an outer surface of the block 12 and communicates with the bottom 30 of the bore 14. The bore 28 has an electrode element 32 extending therethrough, its exposed end part being in the cylinder 14 at or near the bottom 30 thereof. The electrode element 32 fits tightly or is sealed in the bore 28 to prevent loss of liquid from the cylinder or bore 14 during operation of the device.

A similar small bore 34 extends from an outer surface of the block 12 and communicates with, or near to, the bottom 36 of the counter bore 16. An electrode element 38, similar to the electrode element 32, extends through the bore 34 and is disposed adjacent to the periphery of the bore 14, the radius of curvature of the end of the electrode element 38 being at least slightly greater than the radius of the bore 14.

The crosshead guide block 40 is disposed above the block 12. Both the block 12 and crosshead guide block 40 are conveniently secured to a common plate member 42. The crosshead guide block 40 has a bore 44 therein which is aligned with the axis of the bore 14.

Figure 4:
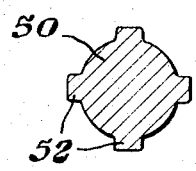
FIG. 4 is a sectional view taken along the line 4—4 of FIG. 1.

Crosshead 46 having a wrist pin coupling at its upper end 48 extends through the bore 44 in the crosshead guide block 40. A piston element 50 having longitudinally extending lands 52 (see FIG. 4, especially) is rigidly coupled to the lower end 54 of the crosshead 46 and extends into the bore 14. The diameter of the piston, including the diametrically opposite lands, is such that the piston and lands fit closely but slidably, .005 clearance, for example, within the smooth walled cylinder or bore 14.

In one instrument made in accordance with this invention the diameter of the bore 14 is ½ inch, the depth of the bore is 1 inch, the piston 50 having a ¼ inch stroke. The piston is disposed within the bore 14 about ¾ inch when the piston is in the upstroke position. Thus, on the downstroke the piston 50 reaches at least very near to the bottom of the bore 14.

An electric motor 56 is secured to the base member 42 with its rotatable shaft 58 extending through the base plate member 42 (through the bore 64). The shaft 58 is perpendicular with respect to the longitudinal axis of the bore 14 and crosshead bore 44, but intersects the common longitudinal axis of those bores. A cam 60 is coupled to the shaft 58 at least approximately at the intersection of the shaft with the above mentioned longitudinal axis. A connecting rod 62 is coupled between the cam 60 and the upper end 48 of the crosshead 46.

A circular plate-like element 66, composed substantially of two semi-circular sections 66a, 66b joined together along their diameters to form a single disc, is coupled to the shaft 58 at a position spaced from the cam 60. One half 66b of the disc element 66 is composed of a magnetic material such as a common steel and the other half 66a of the disc element 66 is composed of a non-magnetic element, such as brass, for example. The element 66 is coupled to the shaft 58 through the center of the disc with the plane faces of the disc 66 being disposed perpendicular to the longitudinal axis of the shaft 58.

The electrode 32 is coupled by means of the central lead 76 of a coaxial cable through a capacitor 78 (8 microfarads capacity is satisfactory) to one input terminal 80 of a high gain operational amplifier 82 which has sufficient feedback, by means of the resistor 84 and capacitor 86 coupled between its output and input circuits, to function as a milli-microammeter when a suitable utilization device such as a meter or recorder 88 is coupled to its output. The outer or shield conductor 90 of the coaxial cable is connected between the upper electrode 38 and the grounded input terminal 92 of the operational amplifier 82.

The output of the operational amplifier 82 is coupled across the primary winding of a transformer 94. The secondary 96 has its center tap grounded and its end leads coupled to the throws 98, 100 of a magnetically controlled single pole double throw switch 102. The switch 102 is physically located adjacent to one side of the plate-like element 66, while a permanent magnet 104 is disposed adjacent to the opposite side of the plate-like element 66. The center pole 106 of the switch 102 is connected, through the lead 108, to a series connected resistor 110 and capacitor 112. The other electrode of the capacitor 112 is connected to ground (as is the center tapped secondary winding 96). The utilization device 88 is coupled across the capacitor 112.

In operation, with the motor 56 energized by a suitable source, such as a battery 68 through the switch 70, the shaft 58 rotates both the cam 60 and the disc element 66.

The rotation of the cam causes the connecting rod 62 to reciprocate, thus moving the crosshead 46 and piston 50 back and forth in a cyclic manner.

Assuming that sample material to be analyzed (have its charge characteristics determined) is fed into the counter bore or sample reservoir 16, the sample liquid enters the bore 14 containing the piston. The offset of the cam 60 is such that on its downward stroke the piston 50 comes near to but does not touch the electrode 32 which lies at the bottom 30 of the bore 14. As the slotted piston 50 reciprocates in the bore 14 sample liquid is alternately forced into (under some degree of vacuum) and forced (under pressure) out of the bore 14, thus flowing first in one direction and then in another between the electrodes 32, 38.

The electrodes 32, 38 may, for example, conveniently be reversible silver-silver chloride electrodes.

Because the lead 76 is coupled to the input of the operational amplifier (which operates as a micro-milliammeter) in series with the capacitor 78, any direct current component of the signal developed between the electrodes 32, 38 is blocked and only the alternating signal produced by the sample material pulsing back and forth between the electrodes 32, 38 is fed into the operational amplifier 82. It should be noted, however, that it may be advantageous in the case of samples of high conductivity to connect the feedback resistor 84 to the electrode directly as shown by the dotted line 85 rather than through the capacitor 78. This lowers the effective impedance of the measuring circuit and improves the effectiveness of collecting and measuring the generated current. This is true because the deleterious effects of the capacitor are in proportion to the current flowing through it and in the latter circuit this current is reduced by a factor of 15 or 20.

The output of the operational amplifier 82 is couppled across the primary winding of the transformer 94, as mentioned previously. Because it is desirable to couple the output signal to a direct current readout device such as a meter or recorder, for example, the magnetically actuated switch 102 is adapted to achieve full wave rectification of the transformer output appearing across the secondary winding 96. Rectification is accomplished by connecting the center pole 106 of the switch 102 alternately to each throw of the switch 102 in synchronism with the pulsing of sample material by the piston 50.

The cam plate-like member 66, which is made of two semi-circular sections joined along their diameters, one of the sections 66b being made of a magnetic material and the other section 66a being made of a non-magnetic material, rotates between the magnetically actuated switch 102 and a permanent magnet 104 disposed adjacent to but on the opposite side of the member 66 from the switch 102. During the half revolution when the magnetic part 66b of the member 66 shields the switch 102 from the field of the magnet 104, the switch 102 is coupled to one throw due to the slight tension caused by the spring 114, for example. Then, when the member 66 rotates to a position whereby the magnetic field may influence the switch 102, the pole of the switch connected to the opposite side of the secondary winding is connected to the other throw of the switch. Thus, since rotation of the shaft 58 (and member 66, attached thereto) controls both the rate (about 4 cycles per second, for example) at which the piston 50 reciprocates and the rate at which the secondary winding 96 output is switched, synchronous full wave rectification of the output of the operational amplifier 60 is easily accomplished.

The resistor 110 and capacitor 112 constitute a "brute force" filter to smooth the rectified output before it is coupled to the D.C. actuated utilization device or recorder 88.

It should be emphasized that the operational amplifier type of milli-microammeter circuit may be replaced by other apparatus, such as an electrometer, which will give considerably different instrument characteristics. If the readout device gives an indication proportional to the voltage appearing at the electrodes rather than to the current, the effects of salts orf other ionized materials in the sample will be accentuated.

The synchronous rectification afforded by the magnetically actuated switch 102 results in a direct current output signal which is phase sensitive. Other phase sensitive rectifying devices, such as a ring demodulator, for example, may be substituted for the synchronous rectifier. If it is not required to know the polarity of the electrical signal which is measured, a non-synchronous type of rectification means may be used.

It has been found that best results are obtained with instruments made in accordance with this invention when no cavitation of the sample occurs as the piston 50 reciprocates. Also, the sample should be kept free of abrasive and fibrous material if the tolerances between the piston 50 and the bore 14 are to be maintained.

Using this instrument as a current measuring instrument makes the signal relatively less dependent on the ionic conductivity of the sample stream than is the case when the instrument is adapted to measure the potential developed across the electrodes 32, 38. For example, when the instrument is adapted to read current, readings of the instrument are not adversely affected enough to become unreliable until the conductivity of the sample stream approaches the conductivity of a 10 percent sodium chloride water solution, especially when the feedback is directly connected to the electrode. The instrument may readily be adapted to read the developed potential by inserting a resistance of suitably high value (at least several megohms, usually) in series with the capacitor 78 and the input of the operational amplifier 82.

An an example of the amplitude of signals obtained with one instrument in accordance with this invention, tap water (Freeport, Tex. area) are used as the sample stream developed signals of the order of $10^{-3}$ volt and $10^{-8}$ ampere. However, because the capacitor 78 isolates any noise signal resulting from dis-symmetry of the electrodes 32, 38 or drift signals, the small signals developed across the electrodes 32, 38 by the movement of the sample through the bore 14 may readily be amplified.

When the instrument is to be calibrated, a standard sample from a source (not shown) is fed into the sample receiving bore 18 in the same manner as is the regular sample. After the instrument has been operated with standard sample in the operating bore 14 for a short time, the signal tends to stabilize at a set value which is a point at which the meter can be calibrated to show the value and polarity of the charge in the sample.

The standard sample may, for example, be a colloidal solution or dispersion wherein the average charge on the particles has previously been determined by other means, such as a by a Zeta meter, for example, which measures electrophoretic mobility of charged particles. If calibration over a wide range is desired, the use of various standard samples may be used.

The walls of the bore 14 may be made of glass or other ceramics, polyethylene, polystyrene, nylon, beeswax, paraffin, or polytetrafluoroethylene, for example, or of other electrically insulating material having suitable dielectric characteristics. One block 12 which has been used is composed of polyethylene, for example.

The outer surface of the piston member 50 may be made of glass or other ceramic material, polyethylene, polystyrene, nylon, polytetrafluoroethylene, or other electrically insulating material having suitable dielectric characteristics. Usually the entire piston rod, rather than just the outer surface of the rod, is made of the insulating material.

The apparatus heretofore described may be used to indicate the average charge density existing on the material adsorbed on the wall of the piston 50 and bore 14 from the sample stream based either on the current or potential developed between the electrodes 32, 38. Typical sample streams may be raw water, sewage, a latex, or oil-water emulsions, for example.

This instrument provides a continuous measurement of the charge density of the adsorbed material taken from the process stream, for example.

In applications where it is desired to produce flocculation of the particles in the stream, the instrument is used to provide an indication of the end point of a titration operation in which a fluocculant material such as alum, ferric chloride, or a suitable polymer such as polyethylenimine, for example, is added to the sample stream as the charge on the material adsorbed from the sample stream is being measured by the instrument of this invention.

In batch titration operation, a predetermined amount of a cationic treating material to be analyzed, such as polyethylenimine, for example, is dispensed into the reservoir bore 16 in a batch-type operation. Then, with the instrument in operation, discrete amounts of a known standard anionic reagent, such as alkylbenzene sulfonate, are dispensed into the reservoir bore 16. The amount of anionic reagent required to neutralize the cationic material, as indicated by zero output on the instrument, is recorded. The strength of the cationic material is then conventionally calculated by multiplying the known strength of the anionic material by the volume of the anionic material dispensed into the reservoir 16 and dividing by the volume of the cationic material dispensed into the reservoir 16.

When titrating materials have charge influencing characteristics, an instrument reading of zero is not always obtained at the equivalence point because of differences in the aggressiveness of the material. Since, in general, the exact deviation of the equivalence point from zero reading to be expected when titrating one material with another will be unknown, the trick of making a second titration right after a first titration is very useful in titrating charge with this instrument. First, an aliquot of sample is titrated to the neutral point of zero microamps as indicated by the instrument. Then a second aliquot of the same sample is added to the neutral mixture and the composite is titrated. The first titration is ignored and the second is taken as the true titer of the sample.

The procedure described above is useful in quality control operations, for example, in which different batches of product must be compared to determine their relative effectiveness, as in the case of cationic flocculants, for example.

In the illustrated embodiment of the invention the lands 52 of the piston 50, as mentioned previously, fit closely but slidably within the bore 14. The walls of the piston element 50 lying between the lands 52 are undercut .003 to .005 of an inch. In some instances a loosely fitting piston having no lands is used.

In addition, increasing or decreasing the clearance between the piston and bore walls may be desirable, depending on the nature of the sample being supplied to the instrument.

The signals developed between the electrodes 32, 38 are believed to be a function of the streaming current. The streaming current in turn is a function of the constant parameters of the apparatus and charge density existing on the walls as a result of the sample characteristics.

What is claimed is:

1. An apparatus for determining a function of the charge condition which is present in a system which includes liquid which contains charge influencing species, comprising a tubular flow path member, said flow path member having electrically insulating walls an open end and a closed end, said flow path member being so disposed that it may be substantially filled with said liquid, a pair of electrodes, one of the electrodes being at least near to the closed end of said flow path member and the other electrode being at least near to the open end of said flow path member, both the electrodes being disposed so as to be contacted by said liquid entering or leaving said flow path member, means for flowing said liquid to and fro in said flow path member in a continuing repetitive manner, means coupled to said electrodes for amplifying any electrical signals induced across said electrodes, and means for utilizing said amplified signals.

2. Apparatus for determining a function of the charge condition which is present in flowable material comprising liquid and charge influencing species, comprising a cup-like flow path member having electrically insulating walls, an open end and a closed end, a block-like reciprocating element whose outer wall is electrically insulating disposed in slidable relationship within said flow path member, said flow path member being so disposed that it may be substantially filled with said flowable material, a pair of electrodes, one of the electrodes being at least near to the closed end of said flow path member and the other electrode being at least near to the open end of said flow path member, both of the electrodes being disposed so as to be contacted by said flowable material entering or leaving said flow path member, said reciprocating element having a transverse cross-sectional configuration such that said reciprocating element fits adjacent to but spaced from said electrically insulating walls of said flow path member, means for reciprocating said reciprocating element in said flow path member, means for admitting predetermined amounts of flowable material to said flow path member, means coupled to said electrodes for amplifying any electrical signals induced across said electrodes, and means for utilizing said amplified signals.

3. Apparatus in accordance with claim 2, wherein said reciprocating element has lands extending along its length.

4. Apparatus in accordance with claim 2, wherein said means for reciprocating said reciprocating element includes a rotating member having an offset throw element coupled thereto.

5. Apparatus in accordance with claim 2, wherein the length of said reciprocating element is at least as long as the spacing between said electrodes.

6. Apparatus in accordance with claim 2, wherein said means for utilizing said amplified signals includes a rectifier circuit and a direct current readout device.

7. Apparatus in accordance with claim 6, wherein said rectifier circuit is a phase sensitive rectifier circuit.

8. Apparatus in accordance with claim 2, wherein said means for admitting flowable material to said flow path includes a reservoir communicating with said flow path member.

9. Apparatus in accordance with claim 2, wherein said means coupled to said electrodes for amplifying any electrical signals includes leads, said leads having a capacitor coupled in series with at least one of them.

10. Apparatus in accordance with claim 7, wherein said phase sensitive rectifier circuit comprises a magnetically actuated switch, an actuating magnet, said actuating magnet being spaced from said switch, and means for repetitively isolating the field of said actuating magnet from said switch.

11. Apparatus in accordance with claim 10, wherein said means for repetitively isolating the field of said actuating magnet comprises a rotating element of magnetic material, said element of magnetic material being rotated in synchronism with the reciprocation of said reciprocating element.

References Cited

UNITED STATES PATENTS 2,769,929    11/1956    Hardway _____ 324—71

RUDOLPH V. ROLINEC, Primary Examiner.

WALTER L. CARLSON, Examiner.

C. F. ROBERTS, Assistant Examiner.